United States Patent

[11] 3,602,192

[72] Inventors Edward G. Grochowski
Wappingers Falls;
Vincent J. Lyons, Poughkeepsie, both of, N.Y.

[21] Appl. No. 825,894
[22] Filed May 19, 1969
[45] Patented Aug. 31, 1971

[73] Assignee International Business Machines Corporation
Armonk, N.Y.

[54] SEMICONDUCTOR WAFER PROCESSING
6 Claims, 5 Drawing Figs.

[52] U.S. Cl. .......... 118/48, 118/500, 198/131
[51] Int. Cl. .......... C23c 11/00
[50] Field of Search .......... 118/48–49.5; 117/106–107.2

[56] References Cited

UNITED STATES PATENTS

| | | | |
|---|---|---|---|
| 2,580,976 | 1/1952 | Toulmin, Jr. | 118/49.5 |
| 2,657,457 | 11/1953 | Toulmin, Jr. | 117/107.1 X |
| 2,896,570 | 7/1959 | Nack et al. | 117/107.1 X |
| 2,897,091 | 7/1959 | Homer et al. | 118/49 X |
| 3,394,679 | 7/1968 | Bentley, Jr. | 118/500 X |
| 3,399,651 | 9/1968 | Fornari | 118/500 |
| 3,424,629 | 1/1969 | Ernst et al. | 118/49.1 X |
| 3,441,000 | 4/1969 | Burd et al. | 118/49.1 |

*Primary Examiner*—Morris Kaplan
*Attorneys*—Sughrue, Rothwell, Mion, Zinn & Macpeak, Hanifin and Jancin and Henry Powers

ABSTRACT: The continuous processing of semiconductor wafers transported through a reactor system having a series of reaction zones permitting separate process functions, with zone isolation achieved through the use of dynamically sealed vapor-purged isolation chambers. An in-line, verticaL arrangement of gas inlets and outlets and planar work supports effect a laminar flow of gaseous materials.

PATENTED AUG 31 1971

3,602,192

SHEET 1 OF 2

INVENTORS.

EDWARD G. GROCHOWSKI
VINCENT J. LYONS

BY Sughrue, Rothwell, Mion, Zinn & Macpeak
ATTORNEYS.

INVENTORS
EDWARD G. GROCHOWSKI
VINCENT J. LYONS

BY Sughrue, Rothwell, Mion, Zinn & Macpeak
ATTORNEYS

SEMICONDUCTOR WAFER PROCESSING

BACKGROUND OF THE INVENTION

1. Field of the Invention

This invention relates to means for continuously processing silicon wafers through a series of related operations, carried out within a single rector, by moving the wafers continuously on tiers through separate reactor treatment zones, which are isolated from each other by means of vapor-purged isolation chambers.

2. Description of the Prior Art

The means for separately treating workpieces with various gases as they are moved on tiers from one treatment zone to another has been previously reported. Often, the treatment zones are adjacent to each other with each treatment being radically different. For example, one treatment zone subjects the workpiece to one specific reaction gas while the adjacent treatment zone subjects the same workpiece to an entirely different reaction environment. The proximity of these treatment zones to each other often leads to an intermixing of the various gases used which has detrimental effects on the workpiece being treated.

In order to reduce the mixing of the gases in adjacent treatment zones, prior art systems employ partitions between the various zones. These partitions may retain the form of a gas curtain generated from a third nondeleterious gas. In addition, these partitions may be extensions in the reactor walls forming a restriction between adjacent treatment zones to further reduce the mixing of various treatment gases. For most prior art applications, these methods were sufficient. However, with the advent of semiconductor devices and the great precision required in their manufacture, any intermixing or dilution of gases is intolerable.

SUMMARY OF THE INVENTION

This invention is directed to a system for continuously processing workpieces in a substantial tier which moves between isolated distinct atmospheres at a distinct pressure relative to the ambient pressures and which system has at least one continuously purged isolation chamber located between the distinct atmospheres.

More specifically, the chamber has spaced end walls which have openings allowing transport of the tier of workpieces from one distinct atmosphere to another. At least one of the end walls has an opening, the cross section of which is complementary to the cross section of the tier and spaced therefrom a minute distance to assist in the creation of a dynamic fluid seal between the moving tier and the conforming wall opening and to isolate the atmospheres in the reaction zones from the atmosphere within the continuously purged isolation chamber. A gas inlet and gas outlet are disposed at circumferentially spaced positions, preferably at opposite peripheral portions of each isolation chamber and directed transverse to the path of movement of the workpieces.

Any suitable means such as a pump can be used to introduce and exhaust the nondeleterious atmosphere in a flow preferably streamlined through the isolation chamber and transverse to the workpiece.

Any small leakage from the adjacent distinct atmospheres, which previously causes contamination of the atmospheres, is now minimized by the combination of the end wall opening, the moving tier, and isolation chamber purge gas. Leakage flows from adjacent chambers continuing beyond said combination are removed or purged from the isolation chamber via the gas outlet prior to entrance of the tier into the next chamber.

This minute gas leakage into the isolation chamber results in part from the movement of the tier from the reaction zone to the isolation chamber. Gaseous molecules are carried on the surface of the workpieces and on the surfaces of the tier that carries them. Any such minute gaseous contamination left on the workpieces as they move from one reaction zone to another will effect the electrical properties of the workpieces if the workpieces are semiconductor wafers.

The susceptors are made of graphite and are interconnected to form a chain or tier. Each susceptor is positioned vertically and is of sufficient length and width to carry approximately four workpieces or wafers on each side of the susceptor.

The susceptors have circular recesses into which the workpieces are placed and held such that the workpieces do not extend beyond the recesses. THe top portion of the susceptors is preferably curved to streamline the flow of gas from the gas inlet over the susceptor and the workpiece. This preferred streamlined flow of nondeleterious gas also serves to form the dynamic seal to isolate the distinct atmospheres from each other.

The bottom of the susceptor is notched to frictionally engage the sides and bottom of the groove in a quartz guide track extending through the isolation chamber and the various distinct atmospheres. One end of each susceptor has a tongue and the other end a groove for connection with complementary ends on adjacent susceptor to form a chain or tier.

DESCRIPTION OF THE PREFERRED EMBODIMENT

Figure 1:
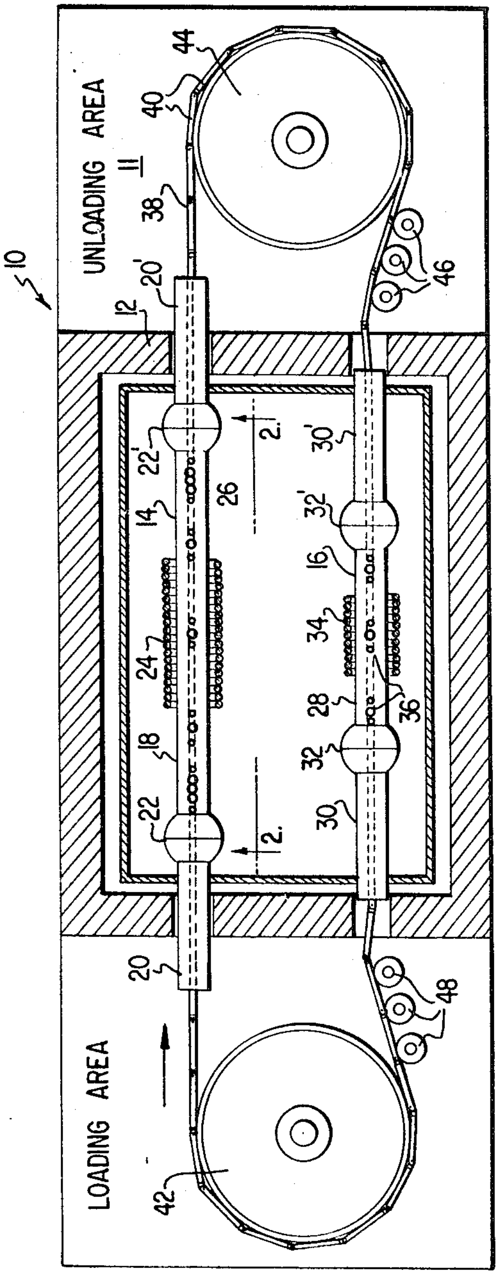
FIG. 1 is a plan view of a processing system for the continuous processing of workpieces employing the dynamic flow seal of the present invention.

Referring to the drawings in detail, first in connection with FIG. 1, there is shown generally at 10 a system for the continuous processing of workpieces such as semiconductor wafers.

A dust-free table 11 has mounted in the middle thereof a hood 12 for supporting vapor growth reactor 14 and the susceptor preparation reactor 16.

The susceptor growth reactor 14 comprises a generally cylindrical tube consisting of a center portion 18 made of a material such as quartz and having two end portions 20, 20′ made of a material such as steel. The steel portions 20, 20′ are joined to the quartz portions 18 along lines 22, 22′. An R.F. coil 24 is mounted around the quartz portion 18 to provide induction-type heating. Purge inputs and reaction gas inputs and outlets are shown generally at 26 and will be discussed in greater detail later.

The susceptor preparation reactor shown generally at 16 is similar to vapor growth reactor 14 but is considerably shorter in length. The susceptor preparation reactor is a generally cylindrical tube having a center portion 28 made of a material such as quartz and two end portions 30, 30′ made of a material such as steel. THe steel portions 30, 30′ are joined to the quartz center portion 28 at points 32, 32′. An R.F. coil 34 surrounds the quartz portion 28 to provide induction-type heating. Gas inputs and outlets shown generally at 36 are also provided.

A continuous susceptor chain 38 consisting of susceptor links 40 is driven in a clockwise direction by rotating drum 42 connected to a motor (not shown).

The susceptor chain 38 passes from the loading area through the growth reactor 14 to the unloading area, around drum 44, over guide wheels 46, through the susceptor preparation reactor 28, over guide wheels 48, and back to motor-driven drum 42 in the loading area.

Figure 2:
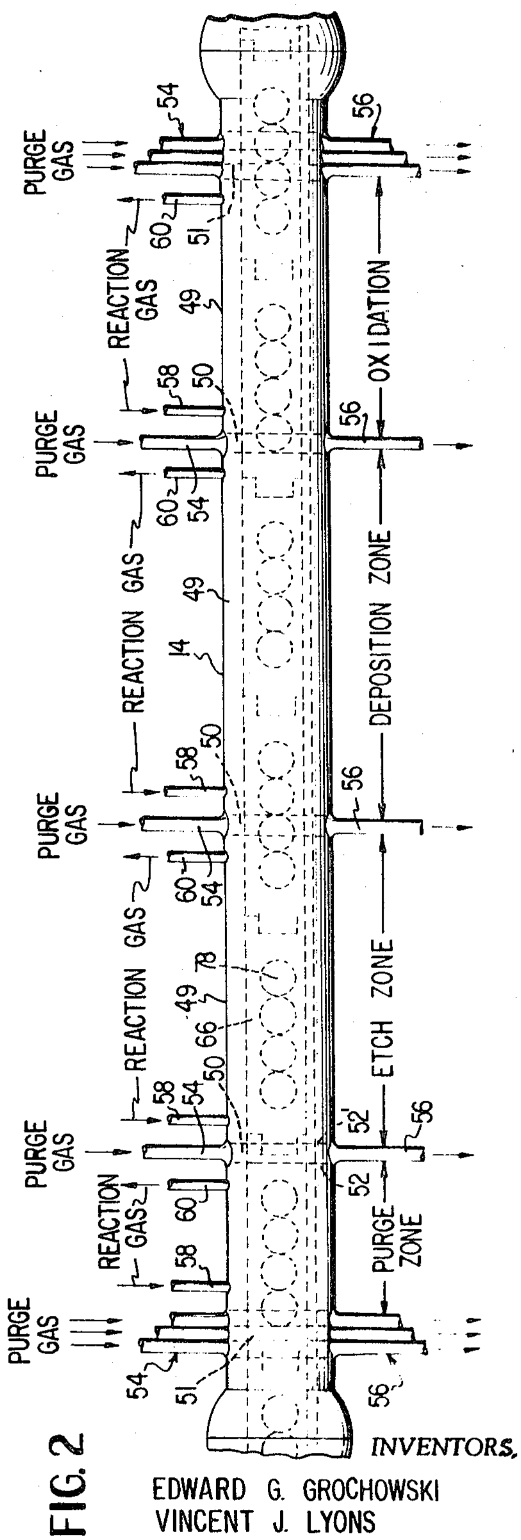
FIG. 2 is an elevational view of one reactor of FIG. 1 taken about lines 2—2.

FIG. 2 shows the quartz center portion of the vapor growth reactor 14 in greater detail. The vapor growth reactor 14 is divided into various zones 49 such as the PURGE ZONE, ETCH ZONE, DEPOSITION ZONE, and a zone for oxidation.

The zones are separated from each other by isolation chambers 50 which comprise joined end walls 52, 52'. Each isolation chamber 50 has opposed inlets 54 and outlets 56 for the passage of a nondeleterious purge gas transversely of the path of movement of the tier. A plurality of isolation chambers 51 are located at each end of reactor 14. Also located in each reaction zone, are inlets 58 and outlets 60 for the passage of the various reaction gases through the zone.

Figure 3:
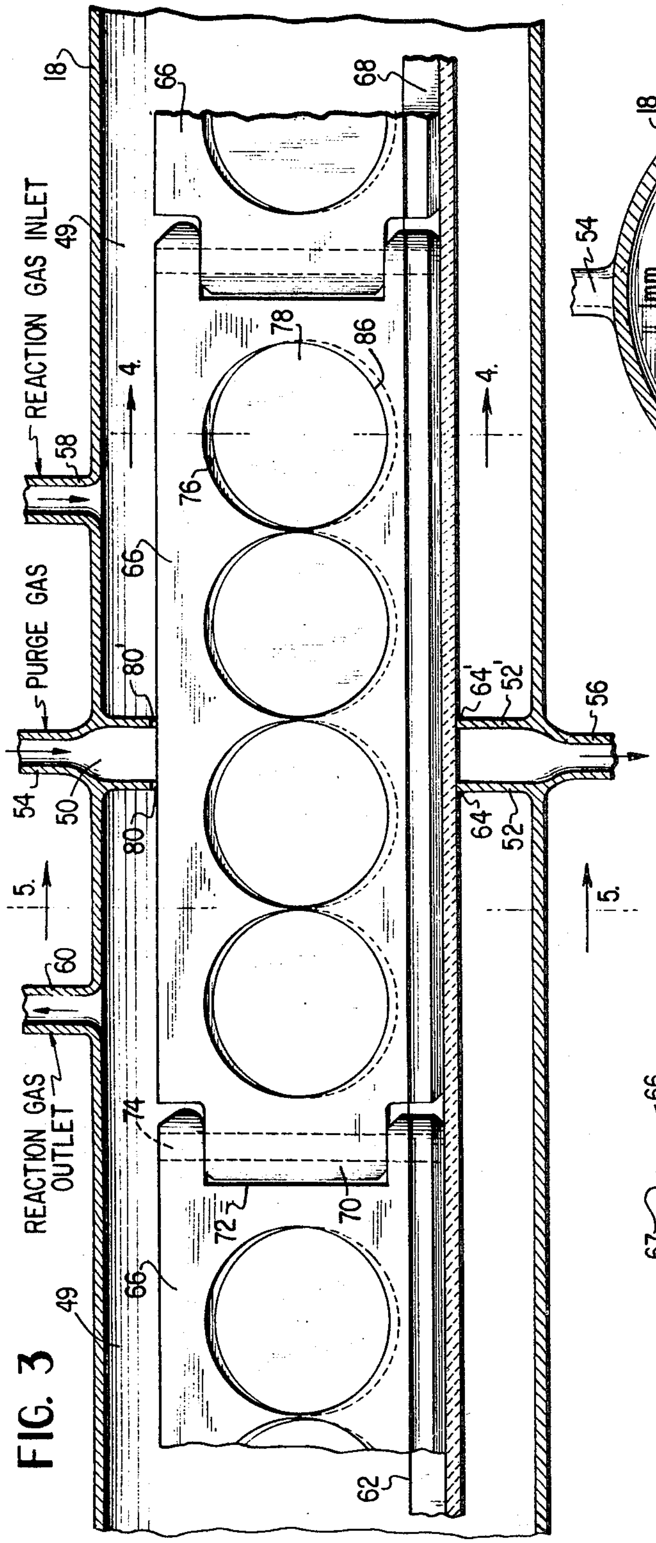
FIG. 3 is an enlarged sectional view of a portion of the reactor shown in FIG. 2.

FIG. 3 shows portions of two reaction zones 49 separated by an isolation chamber 50. A continuous quartz track 62 extends through the various reaction zones 49 and isolation chambers 50, the length of the growth reactor 14. The quartz track 62 has a rectangular groove 68 and is supported by the isolation chamber end walls 52, 52' at points 64, 64'.

The susceptors 66 are made of a material such as graphite and each have a complementary tongue 70 and groove 72. The tongue 70 of one susceptor is held in groove 72 of another susceptor by quartz pin 74 to form the susceptor chain 38. The susceptors 66 have circular recesses 76 on both sides thereof for holding workpieces 78.

The isolation chamber end walls 52, 52' have slots 80, 80' to permit passage of the susceptors into and out of the isolation chamber 50.

In operation, reaction gas enters gas inlet 58 in each reaction zone, flows horizontally through the zone and over the moving susceptor 66 and workpieces 78 and is exhausted through radial outlets 60. As the susceptors 66 move through the isolation chamber end walls 52, there is a tendency for the susceptors to carry minute portions of the gas with them through the narrow clearance between slots 80, 80' and the susceptors 66 either on the surface of the susceptors or workpieces themselves or in the circular recesses 76 holding the workpieces.

To prevent this minute amount of gas from entering the next succeeding reaction zone, a nondeleterious purge gas is introduced into isolation chamber 50 through inlet 54 transverse to the moving susceptors 66. The curved surface 67 of the susceptors 66 shapes the purged gas into two streamlined paths, each of which flow down the side of the susceptor 66 and over the workpieces 78 thus removing any minute particles of reaction gas and exhausting them through outlet 56. This streamlined flow of purge gas through the isolation chamber results in a dynamic seal between two adjacent reaction zones.

Figure 4:
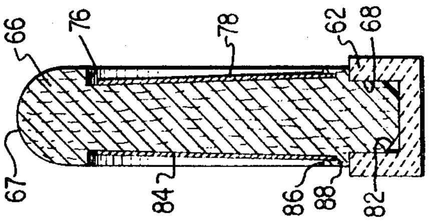
FIG. 4 is an enlarged sectional end view of the susceptor and quartz track of the reactor of FIG. 2 taken about lines 4—4.

FIG. 4 shows a cross section of a graphite susceptor 66 having a base 82 which rides in rectangular groove 68 of quartz track 62. The recess 76 has an end wall 84 inclined towards the center of the susceptor and a lip 86 forming a groove 88, all of which hold the workpiece 78 in the susceptor.

Figure 5:
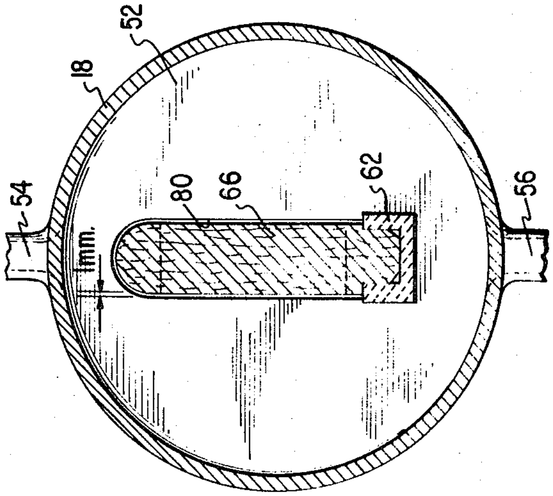
FIG. 5 is a sectional, end view of the reactor portion of FIG. 3 taken along lines 5—5.

FIG. 5 shows a susceptor 66 passing through slot 80 of one of the isolation chamber end walls 52. Slot 80, which is identical to slot 80', permits a clearance of about one millimeter in width between the inside of the slot 80 and the surface of the susceptor 66 with the exception of that portion of the susceptor base 82 which is in groove 68 of quartz track 62. Leakage flow components parallel to susceptor motion are minimized by the narrow clearance between the susceptor 66 and slot 80 as well as by the flow of purge gas to produce a dynamic seal.

While the invention has been particularly shown and described with reference to a preferred embodiment, it will be understood by those skilled in the art that the foregoing and other changes in form and detail may be made therein without departing form the spirit and scope of the invention.

What I claim is:

1. In a processing system for continuously processing workpieces transported in a substantial tier, the improvement comprising: at least two process chambers carrying distinct atmospheres at a distinct pressure relative to ambient pressure, and separated by a continuously purged isolation chamber at a different pressure from that of said process chambers, a series of abutting, vertically extending, planar workpiece carriers forming said tier, each vertically extending planar face of the carrier being recessed whereby to fully receive at least one workpiece therein and to inhibit turbulence thereat, spaced end walls defining said isolation chamber and having an opening of complementary cross section to that of said series of carriers passing therethrough, track means supporting said carriers for serial, abutting movement through said openings from chamber to chamber, a purge gas inlet and an aligned, opposed gas outlet for said isolation chamber lying in substantially the plane of carrier movement and effecting purge gas flow at right angles to the direction of carrier movement, and the top end of each susceptor facing said purge gas inlet and being streamlined to effect laminar flow of said purge gas within said isolation chamber, across said moving carriers and workpieces from said inlet to said outlet.

2. The processing system as set forth in claim 1 wherein a restricted clearance is formed between the opening in said chamber and said tier of workpieces.

3. The processing system as set forth in in claim 2 wherein said restricted clearance is approximately 1 millimeter in width.

4. The processing system as set forth in claim 1 wherein said carriers comprise a number of linked susceptors.

5. The processing system as set forth in claim 4 wherein each said recess adapted to support a workpiece comprises a a circular recess having the end wall thereof inclined toward the center of the susceptor whereby to hold said workpiece.

6. In a processing system for continuous processing of workpieces transported in a substantial tier therethrough between two isolated distinct atmospheres at a distinct pressure relative to ambient pressure, at least one continuously purged isolation chamber connected with said atmospheres and comprising:

a. spaced end walls defining said chamber and having openings for transport of said tier of workpieces therethrough from one of said atmospheres to the other with said openings having a cross section complementary to the cross section of said tier forming a restricted clearance therebetween of approximately 1 millimeter, said restricted clearance being sufficient to provide a pressure gradient between said atmospheres and the atmosphere contained within said continuously purged isolation chamber;

b. a vertically arranged gas inlet and an opposed gas outlet disposed in substantially the plane of tier movement to provide laminar flow between said inlet and outlet transverse to the direction of tier movement;

c. means for insuring the flow of nondeleterious atmosphere across said isolation chamber and transverse to the direction of movement of said workpieces whereby said streamlined nondeleterious atmosphere flow and leakage of said distinct atmospheres through said restricted clearance forms at least one dynamic seal to effect isolation of said distinct atmospheres, and d. a number of linked, vertically extending, planar graphite susceptors, the top portion of each susceptor facing said gas inlet and being of a shape to provide a streamlined flow of said atmosphere contained in said continuously purged isolation chamber over each side of said susceptor, the sides of each susceptor having a number of circular recesses therein, the end wall of said recesses being inclined toward the center of said susceptor to hold said workpieces, and a quartz track passing through said isolated distinct atmospheres and said purged isolation chamber, to support and guide said tier.